(12) United States Patent
Chen et al.

(10) Patent No.: US 11,826,637 B2
(45) Date of Patent: *Nov. 28, 2023

(54) MOBILE DEVICE GAMING ACCESSORY WITH SWAPPABLE BATTERY PACKS AND WIRELESS CHARGING

(71) Applicant: Hewlett-Packard Development Company, L.P., Spring, TX (US)

(72) Inventors: Darwin Chen, Ladera Ranch, CA (US); Baron King Lee, Irvine, CA (US); Salvador Parra, Fountain Valley, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 260 days.

This patent is subject to a terminal disclaimer.

(21) Appl. No.: 16/952,472

(22) Filed: Nov. 19, 2020

(65) Prior Publication Data

US 2021/0104907 A1 Apr. 8, 2021

Related U.S. Application Data

(63) Continuation of application No. 16/591,546, filed on Oct. 2, 2019, now Pat. No. 10,868,436.

(51) Int. Cl.
*A63F 13/00* (2014.01)
*A63F 13/23* (2014.01)
(Continued)

(52) U.S. Cl.
CPC ............ *A63F 13/23* (2014.09); *A63F 13/98* (2014.09); *H02J 7/0044* (2013.01); *H02J 7/342* (2020.01);
(Continued)

(58) Field of Classification Search
None
See application file for complete search history.

(56) References Cited

U.S. PATENT DOCUMENTS 5,577,962 A * 11/1996 Kounoe ............... A63F 13/245
434/21
10,092,829 B2 * 10/2018 Ikuta ...................... A63F 13/98
(Continued)

FOREIGN PATENT DOCUMENTS

CN 107224719 A 10/2017
CN 206673669 U 11/2017
(Continued)

OTHER PUBLICATIONS

Machine translation for CN 206790562 (Year: 2017).*
(Continued)

*Primary Examiner* — Paul A D'Agostino
(74) *Attorney, Agent, or Firm* — Quarles & Brady LLP (57) ABSTRACT

This application discloses mobile device accessories that can be used to facilitate mobile gaming. Systems of the inventive subject matter have two grips and a middle portion that make it easier for users to hold a mobile device. The middle portion can include wireless charging capabilities to transfer power to a mobile device having wireless charging capabilities. Embodiments include a battery pack that can be swapped, and battery packs can additionally include wireless charging capabilities. Systems of the inventive subject matter improve mobile gaming by reducing reliance on batteries that are built in to mobile devices and improving easy-of-use through wireless charging.

18 Claims, 6 Drawing Sheets

(51) Int. Cl.
- *H02J 50/10* (2016.01)
- *H02J 50/90* (2016.01)
- *A63F 13/98* (2014.01)
- *H02J 7/34* (2006.01)
- *H02J 7/00* (2006.01)

(52) U.S. Cl.
CPC .............. *H02J 50/10* (2016.02); *H02J 50/90* (2016.02); *H02J 7/0047* (2013.01)

(56) References Cited

U.S. PATENT DOCUMENTS

| | | | |
|---|---|---|---|
| 10,158,148 B2* | 12/2018 | Hodges | H01M 10/615 |
| 10,686,328 B2* | 6/2020 | Xiao | A63F 13/24 |
| 2003/0104866 A1* | 6/2003 | Campo | A63F 13/92 463/46 |
| 2008/0133052 A1* | 6/2008 | Jones | B25J 9/08 455/39 |
| 2011/0084657 A1 | 4/2011 | Toya et al. | |
| 2011/0234154 A1 | 9/2011 | Navid | |
| 2013/0221923 A1 | 8/2013 | Robertson | |
| 2014/0094309 A1 | 4/2014 | Osawa et al. | |
| 2014/0103789 A1* | 4/2014 | Cox, III | H05K 5/02 312/280 |
| 2014/0302921 A1 | 10/2014 | Smith et al. | |
| 2014/0317329 A1* | 10/2014 | Barnett | G06F 1/1635 710/304 |
| 2015/0031452 A1* | 1/2015 | Rundell | A63F 13/23 463/31 |
| 2015/0084900 A1* | 3/2015 | Hodges | G06F 3/0227 345/173 |
| 2015/0091524 A1 | 4/2015 | Park et al. | |
| 2016/0056664 A1* | 2/2016 | Partovi | H02J 7/0042 307/104 |
| 2016/0094076 A1 | 3/2016 | Kasar et al. | |
| 2016/0141901 A1* | 5/2016 | Navid | H02J 7/0045 320/108 |
| 2016/0361641 A1 | 12/2016 | Koizumi et al. | |
| 2017/0117740 A1* | 4/2017 | Yamanishi | H02J 50/12 |
| 2017/0242486 A1* | 8/2017 | Grant | G06F 3/0338 |
| 2018/0250584 A1* | 9/2018 | Obayashi | A63F 13/211 |
| 2018/0345130 A1 | 12/2018 | Wells et al. | |
| 2019/0197272 A1 | 6/2019 | Paolizzi et al. | |
| 2019/0296571 A1* | 9/2019 | Xiao | A63F 13/98 |

FOREIGN PATENT DOCUMENTS

| | | |
|---|---|---|
| CN | 206790562 U | 12/2017 |
| CN | 207722355 U | 8/2018 |
| KR | 10-2018-0024786 A | 3/2018 |
| TW | M568165 U | 10/2018 |

OTHER PUBLICATIONS

All the best Galaxy Z fold Accessories, You Tube, 2022 at https://www.youtube.com/watch?v=gvsRjFoc-VA accessed on Sep. 30, 2022 (Year: 2022).*

GameSir X2 Wireless Charging controller, You Tube, 2021 at https://www.youtube.com/watch?v=jeKvBZxK7ml accessed on Sep. 30, 2022. (Year: 2021).*

Nintendo Switch Wireless Charging, at https://www.google.com/search?q=nintendo+Switch+Wireless+charging&tbm=isch&ved=2ahUKEwiwtabBwL36AhVCu3IEHSq9AVYQ2-cCegQlABAA&oq=nintendo+Switch+Wireless+charging&gs_lcp=CgNpbWcQAzIEC AAQGDIECAAQGDoGCAAQHhAlOgUIABCABFCeVViljgFgk pYBaAB accessed on Sep. 30, 2022 (Year: 2020).*

Nintendo Switch Wireless Receiver at https://www.google.com/search?q=Nintendo+Switch+Wireless+receiver&tbm=isch&ved=2ahUKEwi4z-2Rwb36AhW2vHIEHbzVAXYQ2-cCegQIABAA &oq=Nintendo+Switch+Wireless+receiver&gs_lcp=CgNpbWcQA 1CgBljHCWDWDGgAcAB4AIABXYgBiAKSAQEzmAEAoAEB qgELZ3dzLXdpei1pbWfAA accessed on Sep. 30, 2022 (Year: 2020).* https://www.powercastco.com/grips/; Wireless Charging Grips for Nintendo Joy-Con Controllers; PowerCast, PA, USA, copyright 2019; downloaded Oct. 2, 2019.

https://www.amazon.com/Qoosea-Controller-4000mAh-Battery-Joystick/dp/B07NL4M4HD; Qoosea Mobile Controller; downloaded Oct. 2, 2019.

https://www.amazon.com/Controller-Fortnite-Joystick-Phone [Latest-4000mAh] /dp/B07KS331TH; Yobwin; Mobile Controller; downloaded Oct. 2, 2019.

* cited by examiner

MOBILE DEVICE GAMING ACCESSORY WITH SWAPPABLE BATTERY PACKS AND WIRELESS CHARGING

This application is a continuation and claims priority to U.S. patent application Ser. No. 16/591,546 filed Oct. 2, 2019. All extrinsic materials identified in this application are incorporated by reference in their entirety.

FIELD OF THE INVENTION

The field of the invention is mobile gaming accessories.

BACKGROUND

The background description includes information that may be useful in understanding the present invention. It is not an admission that any of the information provided in this application is prior art or relevant to the presently claimed invention, or that any publication specifically or implicitly referenced is prior art.

Mobile gaming is a fast-growing industry. Mobile devices (e.g., tablets and smart phones) are increasingly better at computational and graphical processing, which in turn requires increasingly powerful hardware. With more powerful hardware comes higher demand on batteries, but battery technology has been relatively stagnant compared to advances in mobile device technology. Gaming is especially demanding on power provided to hardware in mobile devices, causing batteries to drain quickly.

To address battery drain, hardware makers have created battery packs that can be plugged into a mobile device. These battery packs are typically standalone devices that simply act as an external battery, and because these devices are typically just external batteries, they need to be held separately from a mobile phone (e.g., in a backpack, a pocket, etc.). But for mobile gaming, these external battery packs leave room for further innovation.

Aside from external battery packs, gaming with mobile devices has brought about the advent of several different types of accessories specifically created to facilitate gaming using a mobile device. This genre of accessory includes ergonomic grips that hold a mobile device in a landscape orientation, making it easier for users to hold their mobile devices without, e.g., giving accidental input to a touch screen or giving users a more stable grip on their device. But these accessories are premature and leave ample room for innovation. For example, none of these accessories has yet incorporated wireless charging or swappable battery packs.

Further, wireless charging of mobile devices is quickly becoming ubiquitous. It would be advantageous to incorporate wireless charging capabilities into a device of this nature. Moreover, incorporating wireless charging capabilities into swappable battery packs can also improve the user experience. Thus, there remains a need in the art for improved mobile device gaming accessories.

SUMMARY OF THE INVENTION

The present invention provides apparatuses, systems, and methods directed to mobile device accessories that facilitate mobile device gaming. In one aspect of the inventive subject matter, a mobile device accessory includes a first grip, a second grip, a middle portion disposed between the first and second grips, and a battery pack, where the first grip is coupled with a first side of the middle portion and the second grip coupled with a second side of the middle portion. The middle portion includes a transmission coil beneath a front surface and further includes an electrical coupling on a back surface (e.g., a plurality of receiving pads or a plurality of pins), where the back surface is configured to couple with the battery pack. The first grip, second grip, and middle portion are configured to receive a mobile device between the first and second grips (e.g., so that a mobile device capable of wireless charging can receive power from the transmission coil in the middle portion). The battery pack includes a second electrical coupling (e.g., a plurality of receiving pads or a plurality of pins, depending on the electrical coupling on the middle portion) where the second electrical coupling is configured to contact the first electrical coupling when the battery pack is connected to the back surface of the middle portion (e.g., so that electrical signals and/or power can flow from the battery pack to the transmission coil in the middle portion).

In some embodiments, either the battery pack, the middle portion, or both include at least one magnet to facilitate coupling of the battery pack with the back surface of the middle portion. One or more magnets can be positioned or oriented to enforce battery coupling in restricted orientation (e.g., so the battery can only connect to the middle portion in one or two orientations). Thus, in some embodiments, the middle portion can include at least one magnet with south facing outward and the battery pack can include at least one magnet with north facing outward. Alternatively, or additionally, the middle portion can include at least one magnet with north facing outward and the battery pack can include at least one magnet with south facing outward.

In some embodiments, the battery pack can also include a receiving coil to allow the battery pack to be charged wirelessly.

One should appreciate that the disclosed subject matter provides many advantageous technical effects including wireless charging in a mobile device gaming accessory that eliminates the need for wires or cords.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 7A shows a system of the inventive subject matter with a mobile device and battery pack.

FIG. 7B shows a system of the inventive subject matter with a mobile device and battery pack where the battery pack is plugged in.

FIG. 8 shows a system of the inventive subject matter with a detached battery pack that is plugged into the main body.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing ranges, quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

The following description includes information that may be useful in understanding the present invention. It is not an admission that any of the information provided in this application is prior art or relevant to the presently claimed invention, or that any publication specifically or implicitly referenced is prior art.

Figure 1:
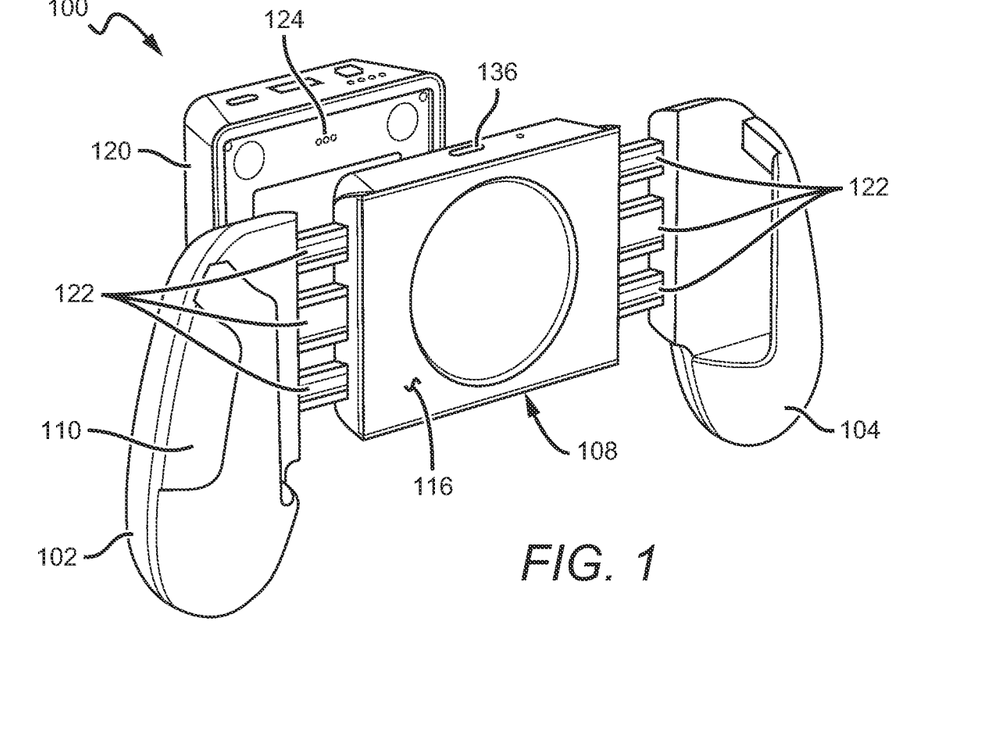
FIG. 1 is a front perspective view of a system of the inventive subject matter showing a detached battery pack.
Figure 2:
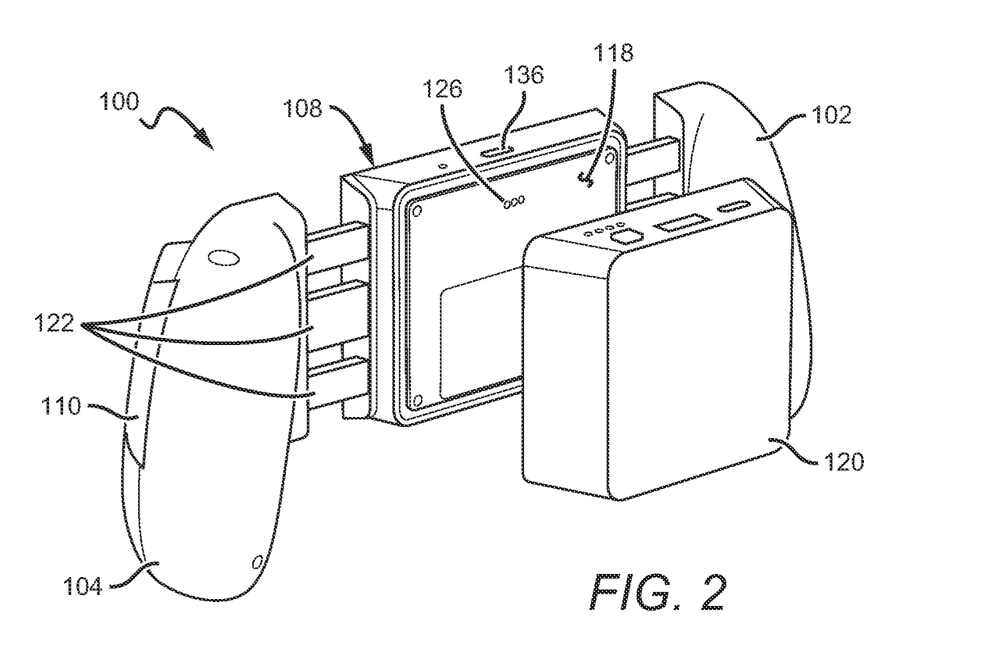
FIG. 2 is a front perspective view of a system of the inventive subject matter showing a detached battery pack.
Figure 3:
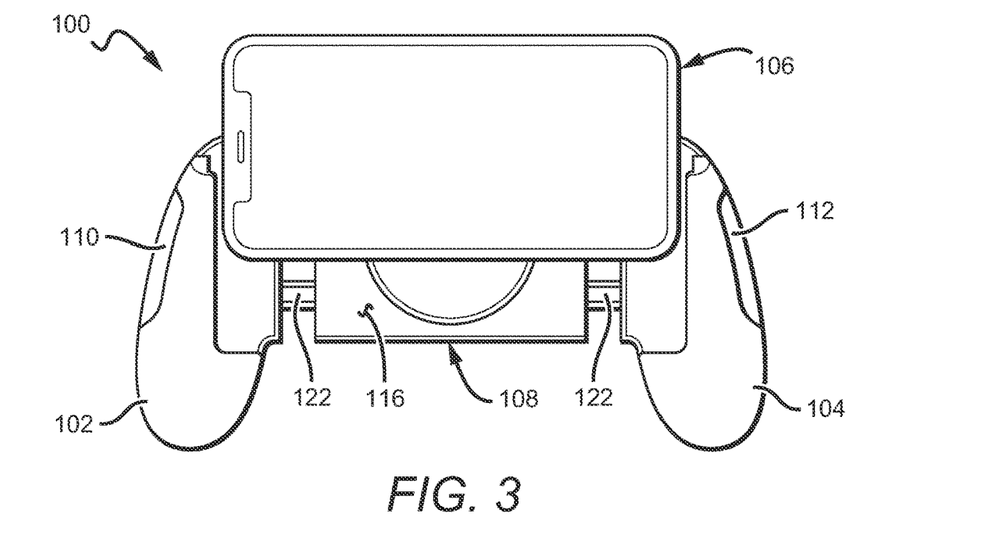
FIG. 3 is a front view of a system of the inventive subject matter showing a mobile device partially disposed between the grips.

Systems of the inventive subject matter facilitate gaming on mobile devices such as smart phones, tablets, and the like. As shown in FIGS. 1-4, systems include a main body 100 having ergonomic grips 102 & 104 that are positioned to hold a mobile device 106 between them and also a middle portion 108 that is configured to house transmission coil 114 that facilitate wireless charging of mobile device 106 while the system is in use. FIG. 3 shows how mobile device 106 can fit between the two ergonomic grips 102 & 104. Each ergonomic grip 102 & 104 includes a cutout 110 & 112 that allows access to an end of the mobile device to facilitate access to ports (e.g., lightning, USB, headphones, etc.). Systems of the inventive subject matter are designed to couple with a battery pack 120, as shown in FIGS. 1 & 2.

As mentioned above, there are several portions making up a system of the inventive subject matter, including a main body comprising ergonomic grips 102 & 104 and a middle portion 108. The middle 108 portion disposed between the grips 102 & 104 has a front surface 116 and a back side 118 where the back side 118 is configured to receive a battery pack 120 and transmission coil 114 is configured to transmit power wirelessly through the front surface 116 to a mobile device 106 when it is used with the system.

Figure 4:
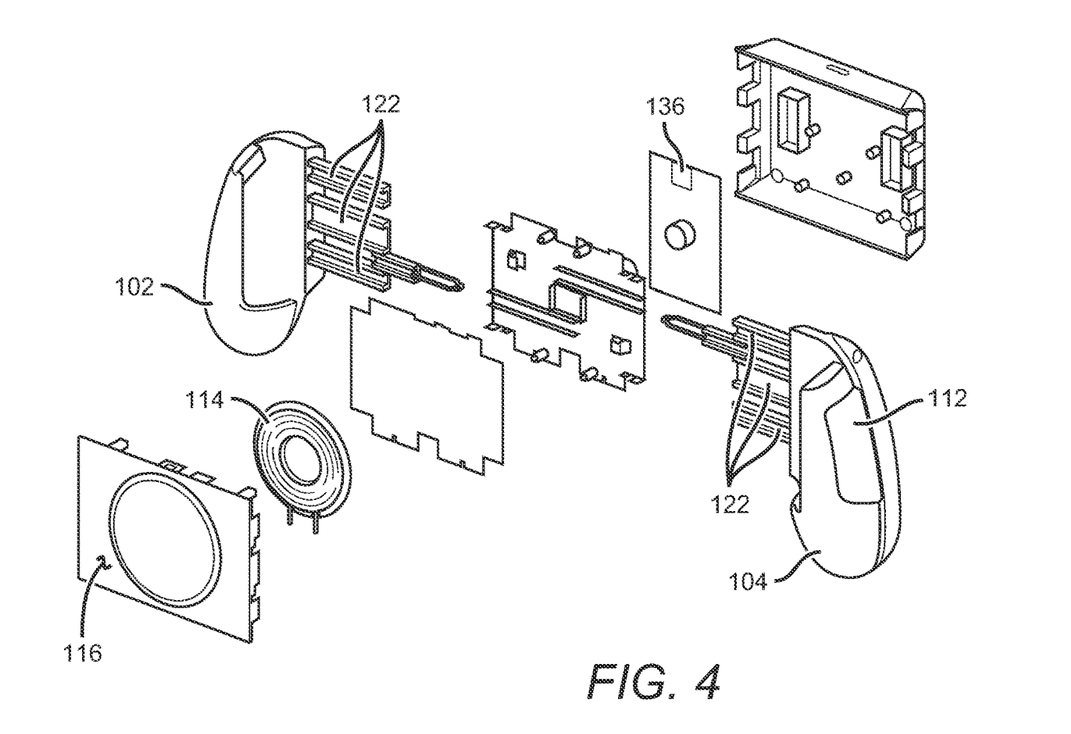
FIG. 4 is an exploded view of a system of the inventive subject without the battery pack.

The middle portion 108 of the main body 100 is translationally coupled with each of the ergonomic grips 102 & 104 by sliding members 122. The grips can translate toward or away from the middle portion along the sliding members 122 to accommodate different sized mobile devices. Each slider can be at least partially disposed within the middle portion 108 or within the ergonomic grip 102 & 104 it is coupled with. As shown in FIG. 4, three sliding members 122 are coupled with each ergonomic grip 102 & 104. In some embodiments, one or two sliding members can be affixed to each ergonomic grip. It is also contemplated that more than three can be included. Thus, moving the ergonomic grips 102 & 104 relative to the middle portion 108 can be accomplished manually by pulling on each grip with enough force to overcome friction between the sliding members 122 and, e.g., the grip, middle portion, or any other mechanisms or components within a system that the sliders move in relation to, depending on the system's configuration. In some embodiments, sliding members 122 can also help with alignment of wireless charging of a mobile device (e.g., a mobile device's charging coils may not be in the center of the mobile device, and the grips can be extended by different amounts to accommodate such configurations).

Figures 7A, 7B, 8:
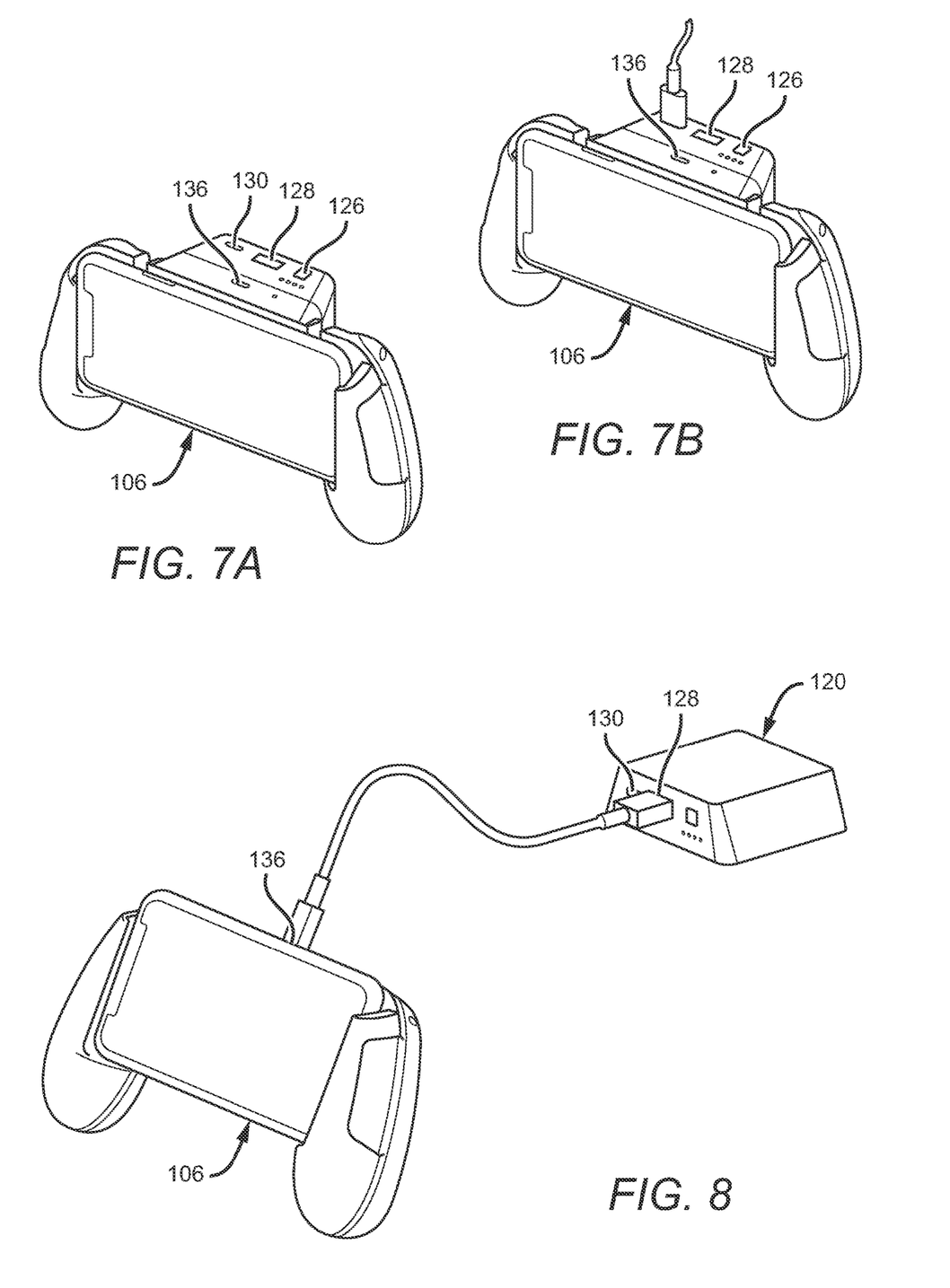

As shown in FIG. 4, which shows the middle portion from the embodiment in FIGS. 1-3 in an exploded view, the middle portion 108 additionally includes a wireless charging transmission coil 114. The coil 114 is located behind the front surface 116 of the middle portion 108 that abuts (or at least comes into close proximity to) a mobile device 106 when the system is in use. Positioning the transmission coil 114 in the middle portion 108 facilitates wireless charging of the mobile device 106 during use (e.g., as shown in FIGS. 7A & 7B). This configuration simplifies the process of using the system by allowing users to put their mobile device into the system, attach a battery pack, and then, e.g., play games without concern for battery drain on the mobile device's onboard battery (although it can be the case that especially demanding apps or games can cause battery drain on the mobile device despite being coupled with a system of the inventive subject matter).

Figure 5:
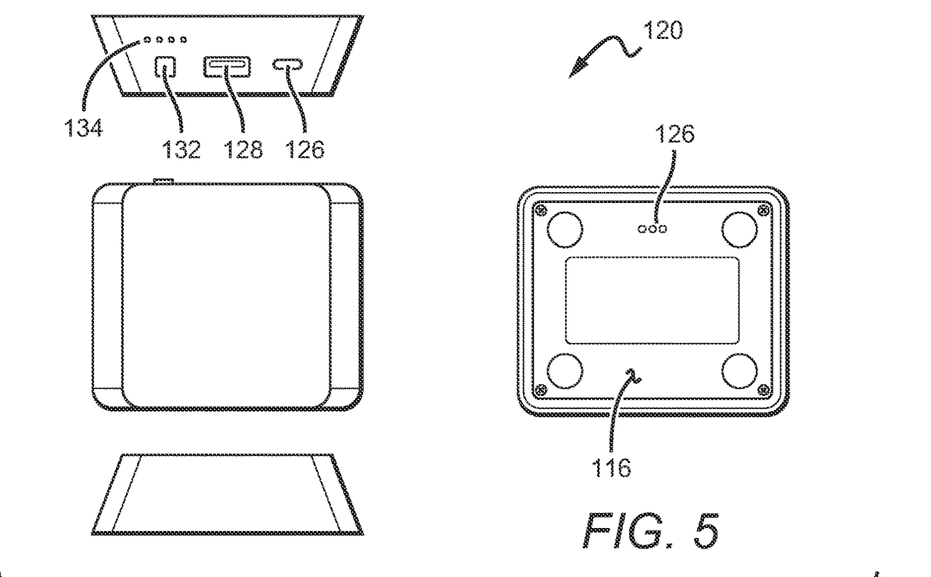
FIG. 5 shows a battery pack of the inventive subject matter.

A battery pack 120 of the inventive subject matter is shown in FIG. 5. Battery packs of the inventive subject matter can couple magnetically with the back side 118 of the middle portion 108 depicted in FIGS. 1-3. Other coupling methods are contemplated by this application, including one or more clips (e.g., a clipping mechanism on either the battery pack or the middle portion that is spring-loaded to mate with a complementary component). In some embodiments, the battery pack is permanently affixed to the middle portion. Battery packs of the inventive subject matter can include protruding pins (e.g., spring-loaded pins), and when the battery pack includes protruding pins 124, as shown in FIG. 1, the middle portion 108 has matching receiving pads 126 configured for the pins 124 to press against so that electricity can flow through the transmission coil 114 in the middle portion 108. In some embodiments, the back side 118 of a middle portion 108 has pins (e.g., spring-loaded pins) and receiving pads are on the battery pack itself (e.g., the inverse of what is shown in FIG. 5). In any configuration or embodiment, when a battery pack couples with the middle portion of a system of the inventive subject matter, an electrical connection is made between the battery pack and a middle portion (e.g., the transmission coil and associated electronics).

To couple with a middle portion, a battery pack can include one or more magnets. Magnets 600 can be positioned in one or more of the corners of the battery pack, as seen in, e.g., FIG. 6, which shows an exploded view of a battery pack. In some embodiments, there are magnets in each corner (e.g., four total magnets); though, fewer than four magnets are also contemplated (e.g., 1-3 magnets). Magnets 600 in the battery pack can be attracted to a ferromagnetic material or other magnets in the middle portion of a system, thereby coupling the battery pack to the middle portion. In some embodiments, magnets can be included in the middle portion additionally or alternatively. When magnets are incorporated into the middle portion, their polarities can be oriented such that the battery pack can couple only with the middle portion in a particular orientation (e.g., so that the pins and receiving pads are matched upon coupling).

Figure 11:
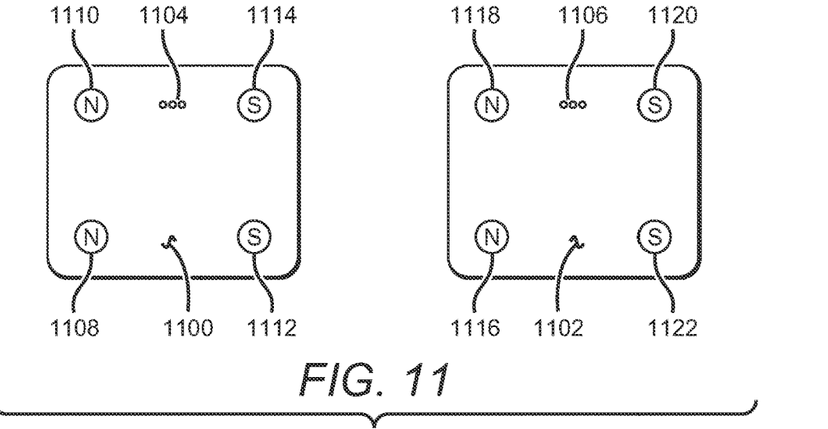
FIG. 11 shows a possible configuration for magnets that facilitate coupling a battery pack to a middle portion.

For example, if magnets along a particular side of the battery pack are configured with north facing outward from the middle portion and the magnets along the other side are configured so that south faces outward from the middle portion, then the magnets in the battery pack can have two magnets with south facing outward to match with the north-facing-outward magnets in the middle portion and two magnets with north facing outward to match with the south-facing-outward magnets in the middle portion. This configuration is shown in FIG. 11, which shows the back side of the middle portion 1100 with magnets 1108 and 1110 having north facing outward and magnets 1112 and 1114 having south facing outward. Magnets 1116, 1118, 1120, and 1122 on the back side of the battery pack 1102 are positioned and oriented so that magnets 1116 and 1118 have south facing outward to match with magnets 1112 and 1114 and so that magnets 1120 and 1122 are positioned and oriented to match with magnets 1108 and 1110, thus holding the battery pack to the middle portion and ensuring that the battery pack can only properly couple with the middle portion in one orientation, ensuring that pins 1106 come into contact with receiving pads 1104.

Figure 12:
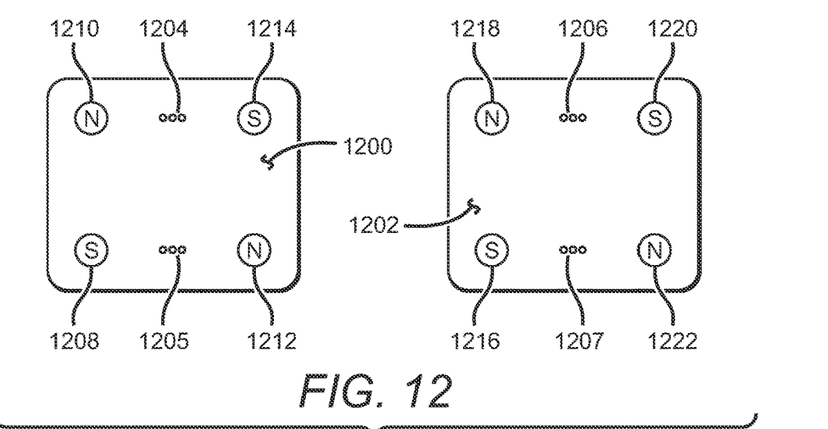
FIG. 12 shows another possible configuration for magnets that facilitate coupling a battery pack to a middle portion.

FIG. 12 shows an alternative configuration like the one shown in FIG. 11. Magnets 1210 and 1212 incorporated into the back side of the middle portion 1200 are oriented with north facing outward while magnets 1208 and 1214 are oriented so that south is facing outward. To match, magnets 1218 and 1222 on the back side of the battery pack 1202 are oriented so that north is facing outward to match with magnets 1210 and 1212, while magnets 1216 and 1220 are oriented with south facing outward to match with magnets 1210 and 1212. This configuration creates two possible orientations for the battery pack (e.g., as shown, and rotated 180 degrees). In some embodiments, additional pins 1207 can be included so that regardless of the two possible orientations at least one of the sets of pins 1207 or 1206 will come into contact with the receiving pads 1204. In other embodiments, extra receiving pads 1205 are included in addition to receiving pads 1204 such that regardless of battery pack orientation, pins 1206 contact a set of receiving pads 1204 or 1205. In some embodiments both extra pins 1207 and extra receiving pads 1205 are included. Additionally, pins can be located on the middle portion and receiving pads on the battery pack, as described above, without departing from the inventive subject matter.

Figure 13:
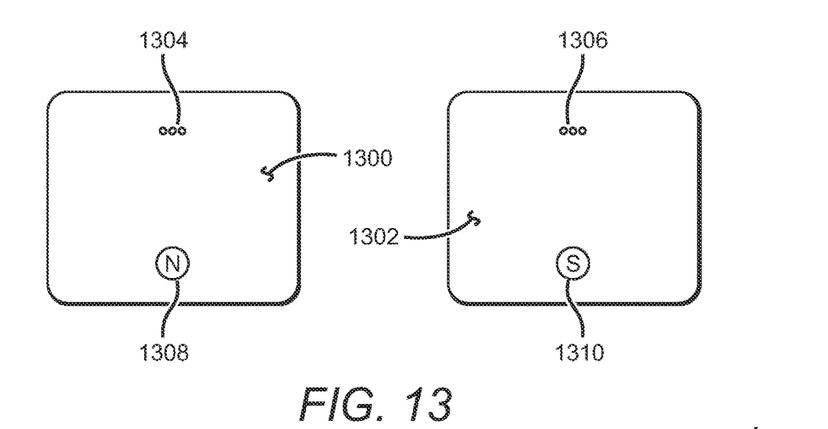
FIG. 13 shows another possible configuration for magnets that facilitate coupling a battery pack to a middle portion.

A variety of different magnet configurations are also contemplated. For example, FIG. 13 shows the back side of a middle portion 1300 and the back side of a battery pack 1302, where the back side of the middle portion 1300 includes receiving pads 1304 and the back side of the battery pack has pins 1306. The back side of the middle portion 1300 includes a magnet 1308 and the back side of the battery pack 1302 also includes a magnet 1310 (although the magnets are shown with magnet 1308 having north facing out and magnet 1310 having south facing out, these could be switched without departing from the inventive subject matter). Because the magnets 1308 and 1310 are off-center, the battery pack will only couple with the middle portion when the magnets are aligned, effectively allowing for only one correct coupling orientation (e.g., all other orientations would result in misalignment of the magnets that hold the two components together and also misalignment of the pins 1306 and receiving pads 1304).

Pins and receiving pads can be positioned on both a battery pack and the back side of a middle portion of a system of the inventive subject matter so that the battery pack only functions when it is coupled with the middle portion in a particular orientation (e.g., so that the pins and receiving pads only come into contact when the battery pack is properly oriented). As shown in FIG. 5, the pins 126 on the battery pack 120 are located on the upper half of the battery pack 120. To match, the receiving pads 126 as shown in FIG. 2 are positioned in the upper half of the middle portion 108 This ensures that the battery pack couples with the middle portion so that its various ports and indicator lights (e.g., USB or other charging ports and lights to indicate charge level) are facing upward and therefore visible to a person when the system is in use. It is also contemplated that the battery pack can include a ferromagnetic material while the middle portion itself incorporates one or more magnets.

Orientation of the battery pack can also be enforced by incorporating features on both the back surface of the middle portion and on the side of the battery pack that couples with the middle portion. For example, one of the two surfaces (e.g., the back side of the middle portion or the side of the battery pack that couples with the back side of the middle portion) could include a uniquely shaped feature (e.g., a protrusion or groove) that has a complementary feature on the opposite surface.

In embodiments where the pins and contact pads are asymmetrically located on the battery pack and middle portion, the battery must couple with the middle portion in a particular orientation to ensure an electrical connection. The features described above can enforce proper orientation thus ensuring electricity can flow from the battery pack to the transmission coil within the middle portion.

Battery packs of the inventive subject matter can include several ports and other features (e.g., indicator lights and buttons). Battery pack 120 shown in FIG. 5 can include two ports 128 & 130, one button 132, and 4 LEDs 134. The ports can be any type of port used for, e.g., power transmission or data transfer. In the battery pack 120, as shown in FIG. 5, a first port 128 is a USB-A port and the second port 130 is a USB-C port. Any other type of port (e.g., USB, dedicated power delivery, or otherwise) can be incorporated as needed to ensure the battery pack can function as described in this application. In some embodiments, LEDs 134 can be used to indicate battery charge status (e.g., 0-25%, 25-50%, 50-75%, and 75-100% based proportionately on the number of lights that illuminate). LEDs 134 can also indicate that charging is taking place by blinking, e.g., in a sequence or pattern to convey charge information (e.g., two LEDs are lit and a third blinks while the charge state of the battery is between 50 and 75%).

Ports 128 and 130, as seen in, e.g., FIG. 7A, included on the battery pack can offer several functionalities. For example, as shown in FIG. 7B, the battery pack can be charged by plugging the battery pack into a power source (e.g., a wall) via port 130 on the battery pack (e.g., even while a mobile device is being used with a device of the inventive subject matter as seen in FIG. 7A). In some embodiments, power can be transferred to the battery pack through a wide variety of port standards, including USB-A (e.g., port 128) and USB-C (e.g., port 130). Similarly, as shown in at least FIGS. 1 & 2, the middle portion 108 can include a port 136 that allows the battery pack (or any other battery pack or power source) to be plugged directly into the main body 100, thereby supplying electricity to the transmission coil disposed in the middle portion. Port 136 is shown in use in FIG. 8, which shows a detached battery pack coupled with the main body by a charging cable. Port 136 can similarly couple the main body to any power source, battery powered or otherwise.

Figure 9:
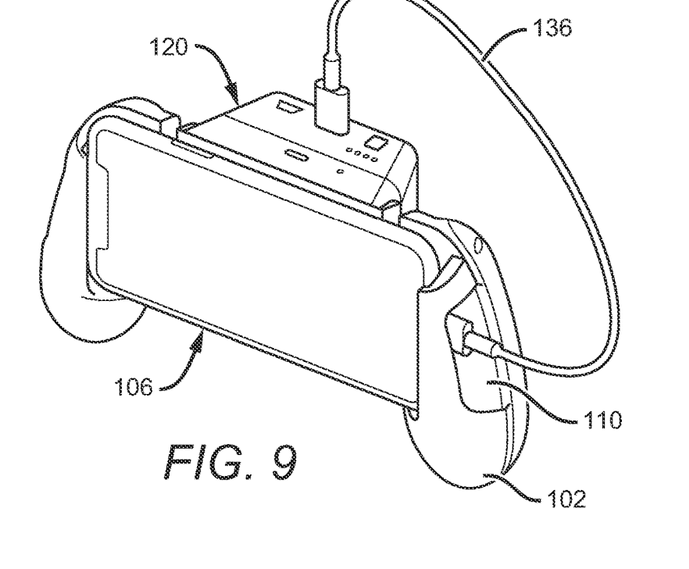
FIG. 9 shows a system of the inventive subject matter with an attached battery pack where the battery pack is connected directly to the mobile device.

FIG. 9 shows a system of the inventive subject matter in use with a mobile device 106 that is being charged via cable 138 rather than wireless charging. A cable 138 can couple the mobile device 106 with the battery pack 120 directly (e.g., via any of the ports on the battery pack, though preferable with a USB or similar port), where the cable 138 couples with a port on the mobile device 106 through an opening 110 in an ergonomic grip 102. This configuration can be employed for devices that support wireless charging and those that don't.

Figure 6:
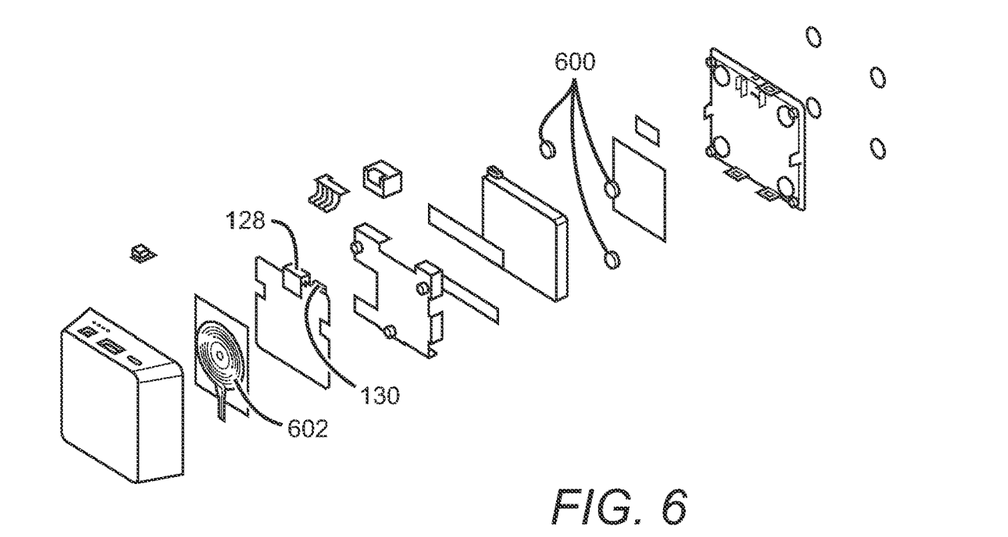
FIG. 6 is an exploded view of a battery pack of the inventive subject matter.
Figures 10A, 10B:
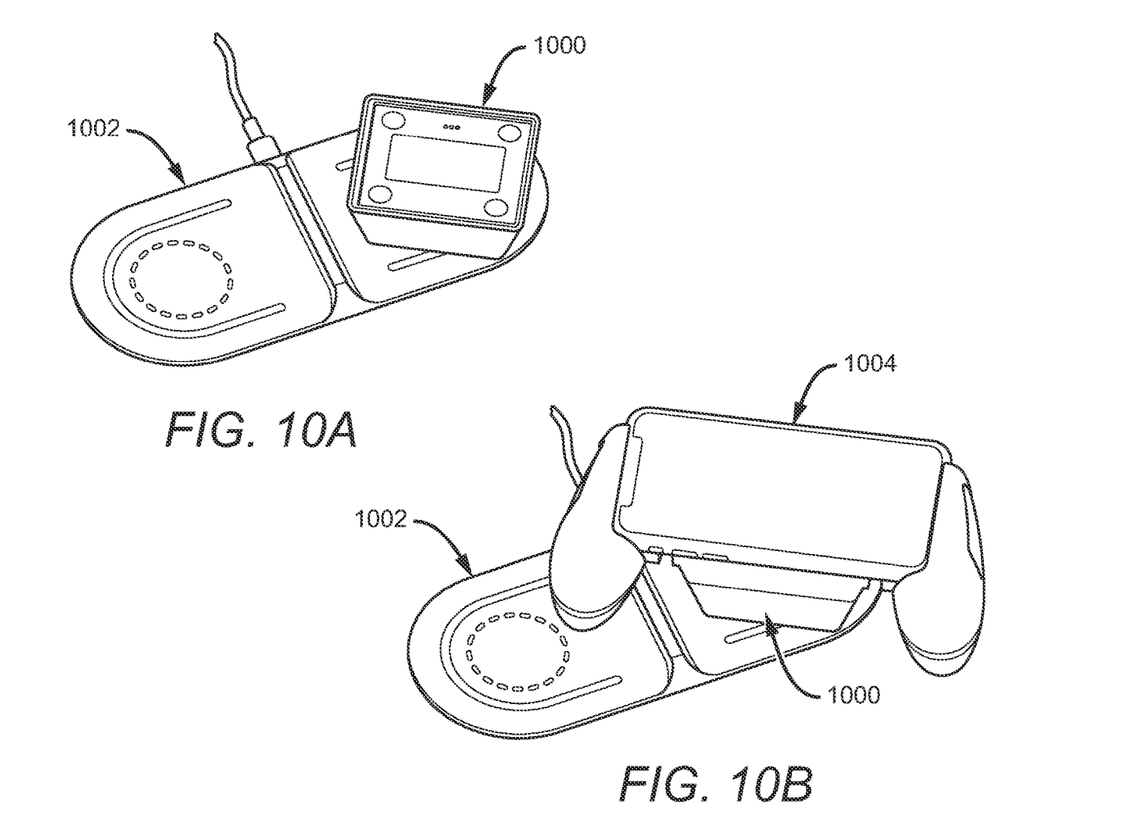
FIG. 10A shows a battery pack of the inventive subject matter on a charging pad.
FIG. 10B shows a system of the inventive subject matter with an attached battery pack on a charging pad.

In some embodiments, battery packs of the inventive subject matter can additionally include a receiver coil (e.g., to facilitate wireless charging of the battery pack). FIG. 6 shows a receiver coil 602 that can be included in a battery pack, and FIG. 10 shows a battery pack 1000 resting on a charging pad 1002. FIG. 10B shows a system of the inventive subject matter resting on a charging pad 1002 such that the battery pack 1000 can charge. In some embodiments, the configuration shown in FIG. 10B can cause both the battery pack 1000 and the mobile device 1004 to charge simultaneously. Having a wireless charging capable battery pack adds to the convenience and ease-of-use of the entire system by allowing users to simply set down either the battery pack 1000 or a system with battery pack attached on a charging pad 1002.

Wireless charging is discussed in this application with respect to the middle portion charging a mobile device and with respect to the battery pack being wirelessly charged. All wireless charging coils discussed in this application can be compliant with different wireless charging protocols, including near-field protocols such as Qi, PMA, Frequency 326, and Typhoon.

Ideal operating frequencies for wireless charging can typically be in the range of 87 to 205 kHz, with peak resonance near 100 kHz. In some embodiments, operating frequency can be as low as 50 kHz and as high as 120 kHz-1 MHz. To make wireless charging possible, a charging surface (e.g., the interior surface 116 of a middle portion or the back side of a battery pack 120, as described above and shown in the Figures) is positioned in proximity to a wireless transmission coil. The charging surface can be made from one or any combination of a non-metallic, non-ferrous materials, such as one or any combination of rubber, plastic, composite, leather, etc. In some embodiments, other materials can also be included so long as those materials do not interfere with wireless charging. Any material that does not interfere with the magnetic field generated by transmission coil can be used to create (in whole or in part) a charging surface.

Different embodiments of charging surfaces can have different thicknesses. Thickness can range from 0.5 mm to 10 mm. In some embodiments, a charging surface can be as thin as 0.1 mm depending on the stiffness of the charging surface material or materials and charging surface design (e.g., when thinner charging surfaces are implemented, a stiffer material or material engineered for added stiffness can help to maintain structural integrity). Efficient power transfer between wireless charging coils can occur at distances between about 5 mm up to about 40 mm, so a charging surface must not be so thick as to prevent coils from being able to efficiently transmit or receive power. Coils can be configured to transmit or receive between 5 W and 30 W of load power (e.g., 5 W, 8 W, 10 W, 12 W, and 15 W). In some embodiments, coils can have an outer diameter (or, e.g., an equivalent widest measurement in embodiments where coils are not arranged in a circle configuration) of, preferably, 47 mm, but outer diameters ranging from 10 mm to 100 mm are also contemplated with ranges preferably existing within 30-50 mm. Many different coil configurations are contemplated including circular configurations, predominantly rectangular configurations, elliptical configurations, etc. (e.g., any configuration that can facilitate inductive transfer of power between a transmission coil and a receiving coil). In some ideal configurations, a receiving and transmitting coil are perfectly aligned, the distance between coils will be less than the diameter of the coils, and the coils will be shielded externally by ferrite, thus resulting in idealized power transfer.

In practice, ideal conditions may differ from those described above, dependent on factors such as compliance with various wireless charging standards (e.g., Qi), design constraints, or other mechanical constraints. For example, size, shape, and dimensions of a coils can be dictated according to a wireless transfer protocol, but coil sizes, shapes, and dimensions can also be influenced by housing constraints (e.g., the receiver coil's size may be constrained by housing dimensions, preventing it from being the same size as the power transfer coil). Nevertheless, any configuration of coils can be idealized given a variety of constraints, resulting in a maximum power transfer rate.

Implementation of wireless charging can be accomplished by receiving an emitted charge (e.g., from a transmission coil in a charging pad or in a middle portion) at a receiver (e.g., in a battery or in a mobile device). Some embodiments of the inventive subject matter incorporate wireless charging components that are compatible with Qi standard communication to establish the connection needed for Qi charging. For example, power reaching a battery pack through its receiving coil can be routed to a power management chip that distributes the power to a rechargeable battery contained therein. In some embodiments, the power management chip also controls and provides power to a visual indicator (e.g., one or more LEDs as discussed in this application) to notify the users of a battery pack's status (e.g., upon a button press). In some embodiments, power management may also be provided as part of a single-chip solution.

In some embodiments, the battery pack can detect alignment between its receiver coil and a transmission coil in, e.g., a charging pad by a signal sent from the battery pack's power receiver coil control circuitry to a separate controller that operates a feedback response, e.g., activating an LED, to indicate that alignment has been achieved. The alignment detection signal sent to a feedback controller can be, for example, triggered by changes in the operating state of the battery pack receiving coil, such as entering a power transfer state.

In some embodiments, power can be delivered via wireless transmission to a power management chip (e.g., in a mobile device or in a battery pack) without interruption, even if the battery to be charged is full. In such embodiments, instead of transmitting an end power transfer packet in response to a digital ping when a battery is full, the receiver coil control circuitry will instead transmit a signal strength packet. This can also enable implementation of discrete power receiver coil control circuitry because in such embodiments it would be unnecessary for the power receiver coil control circuitry to read the status of a battery. In some embodiments, this feature can also facilitate charging a mobile device coupled to a system of the inventive subject matter without depleting the battery pack, thereby extending the life of the battery pack, by charging directly from received wireless power even while the battery pack is full. Because power delivery is uninterrupted, a visual indication that a device is charged or properly aligned can be displayed visually (e.g., by LED indicator lights or using a mobile device's screen) despite, e.g., being turned off. In some embodiments, when a battery (e.g., in a mobile device or in a battery pack) is fully charged, a power management chip detects that charge state and sends a signal to the wireless charging receiver chip (e.g., a Qi-charging receiver chip). In response, the receiver cuts off battery charging. The power management chip can also trigger a full-charge indication to alert a user that the battery pack is fully charged.

Thus, mobile device gaming grips featuring wireless charging and swappable battery packs have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A mobile device accessory for a wireless charging enabled mobile device, comprising:
   a rechargable removeable battery pack;
   a middle portion disposed between a first grip and a second grip;
   wherein the middle portion comprises a transmission coil to facilitate wireless power transmission to the wireless charging enabled mobile device;
   wherein the middle portion is configured to be physically coupled to the removeable battery pack,
   wherein the removeable battery pack and the middle portion comprise an electrical coupling to facilitate an electrical connection between the removeable battery pack and the transmission coil such that the removeable battery pack is configured to electrically couple with the transmission coil; and
   wherein the mobile device accessory is configured to couple with the wireless charging enabled mobile device such that the transmission coil is positioned to wirelessly transmit power to the wireless charging enabled mobile device upon coupling.

2. The mobile device accessory of claim 1, wherein the removeable battery pack comprises at least one magnet to facilitate coupling with a back surface of the middle portion.

3. The mobile device accessory of claim 1, wherein the middle portion comprises at least one magnet to facilitate coupling with the removeable battery pack.

4. The mobile device accessory of claim 1, wherein the middle portion comprises at least a first magnet and the removeable battery pack comprises at least a second magnet to facilitate coupling the removeable battery pack with the middle portion.

5. The mobile device accessory of claim 1, wherein the middle portion comprises a plurality of receiving pads and the removable battery pack comprises a plurality of pins to facilitate the electrical connection between the removeable battery pack and the transmission coil.

6. The mobile device accessory of claim 1, wherein the removeable battery pack comprises a plurality of receiving pads and the middle portion comprises a plurality of pins to facilitate the electrical connection between the removeable battery pack and the transmission coil.

7. A mobile device accessory for a wireless charging enabled mobile device, comprising:
   a rechargable removeable battery pack comprising a receiving coil to facilitate wireless charging;
   a middle portion disposed between a first grip and a second grip;
   wherein the middle portion comprises a transmission coil to facilitate wireless power transmission to the wireless charging enabled mobile device;
   wherein the middle portion is configured to be physically coupled to the removeable battery pack,
   wherein the removeable battery pack and the middle portion comprise an electrical coupling to facilitate an electrical connection between the removeable battery pack and the transmission coil such that the removeable battery pack is configured to electrically couple with the transmission coil; and
   wherein the mobile device accessory is configured to couple with the wireless charging enabled mobile device such that the transmission coil is positioned to wirelessly transmit power to the wireless charging enabled mobile device upon coupling.

8. The mobile device accessory of claim 7, wherein the removeable battery pack comprises at least one magnet to facilitate coupling with the middle portion.

9. The mobile device accessory of claim 7, wherein the middle portion comprises at least one magnet to facilitate coupling with the removeable battery pack.

10. The mobile device accessory of claim 7, wherein the middle portion comprises at least a first magnet and the removeable battery pack comprises at least a second magnet to facilitate coupling the removeable battery pack with the middle portion.

11. The mobile device accessory of claim 7, wherein the middle portion comprises a plurality of receiving pads and the removable battery pack comprises a plurality of pins to facilitate the electrical connection between the removeable battery pack and the transmission coil.

12. The mobile device accessory of claim 7, wherein the removeable battery pack comprises a plurality of receiving pads and the middle portion comprises a plurality of pins to facilitate the electrical connection between the removeable battery pack and the transmission coil.

13. A mobile device accessory for a wireless charging enabled mobile device, comprising:
 a middle portion disposed between a first grip and a second grip;
 wherein the middle portion comprises a transmission coil to facilitate wireless power transmission to the wireless charging enabled mobile device;
 wherein the middle portion is configured to be physically coupled to a rechargable removeable battery pack; and
 wherein the middle portion comprises an electrical coupling to facilitate an electrical connection between the removeable battery pack and the transmission coil;
 wherein the mobile device accessory is configured to couple with the wireless charging enabled mobile device such that the transmission coil is positioned to wirelessly transmit power to the wireless charging enabled mobile device upon coupling.

14. The mobile device accessory of claim 13, wherein the middle portion comprises at least one magnet to facilitate coupling with the removeable battery pack.

15. The mobile device accessory of claim 14, wherein the at least one magnet is oriented with south facing outward.

16. The mobile device accessory of claim 14, wherein the at least one magnet is oriented with north facing outward.

17. The mobile device accessory of claim 13, wherein the electrical coupling comprises a plurality of receiving pads.

18. The mobile device accessory of claim 13, wherein the electrical coupling comprises a plurality of pins.

* * * * *